(12) United States Patent
Baki et al.

(10) Patent No.: US 9,739,075 B2
(45) Date of Patent: Aug. 22, 2017

(54) KEY

(71) Applicant: INTERNATIONAL BUSINESS MACHINES CORPORATION, Armonk, NY (US)

(72) Inventors: Abdul Baki, Hursley (GB); Colin J. Holyoake, Hursley (GB); Matthew J. Kockott, Hursley (GB); John A. Owen, Hursley (GB); Richard Postlethwaite, Hursley (GB); Joanne E. Woods, Hursley (GB)

(73) Assignee: International Business Machines Corporation, Armonk, NY (US)

( * ) Notice: Subject to any disclaimer, the term of this patent is extended or adjusted under 35 U.S.C. 154(b) by 62 days.

(21) Appl. No.: 14/965,107

(22) Filed: Dec. 10, 2015

(65) Prior Publication Data
US 2016/0186459 A1  Jun. 30, 2016

(30) Foreign Application Priority Data

Dec. 23, 2014 (GB) .................................. 1423036.1

(51) Int. Cl.
*E05B 19/26* (2006.01)
*E05B 19/04* (2006.01)
(Continued)

(52) U.S. Cl.
CPC ............ *E05B 19/26* (2013.01); *B22D 21/005* (2013.01); *B22D 21/025* (2013.01); *B22D 25/02* (2013.01);
(Continued)

(58) Field of Classification Search
CPC ...... E05B 19/26; E05B 15/1635; E05B 19/04; B22D 21/025; B22D 21/005; B22D 25/02; B23K 31/02
See application file for complete search history.

(56) References Cited

U.S. PATENT DOCUMENTS 5,136,869 A  8/1992 Best et al.
5,615,565 A  4/1997 Field et al.
(Continued)

FOREIGN PATENT DOCUMENTS

CN   2212629 Y   11/1995
CN   201902059 U   7/2011
(Continued)

OTHER PUBLICATIONS

Baki et al., Examination Report for GB Application No. GB1423036.1, dated Aug. 2, 2016 (3 pages).
(Continued)

*Primary Examiner* — Moshe Wilensky
(74) *Attorney, Agent, or Firm* — Mark G. Edwards

(57) ABSTRACT

A key for operating a mechanical lock, which key includes a head portion for holding by a user, a lock-engaging portion for inserting into the lock for operating the lock by the application of a turning force, and a joining portion between the head portion and the lock-engaging portion and fixing the head portion to the lock-engaging portion. The joining portion includes a shape memory material, which reversibly deforms without breakage when a first turning force on the key is exceeded, where the first turning force is lower than a second turning force. The second turning force being a turning force which if exceeded causes breakage of the lock-engaging portion or the head portion. The shape memory material may exhibit a superelastic effect in which the shape is restored when the turning force ceases, or shape memory effect in which the shape is restored on heating above a state-transition temperature.

9 Claims, 4 Drawing Sheets

(51) Int. Cl.
*B22D 25/02* (2006.01)
*B22D 21/00* (2006.01)
*B23K 31/02* (2006.01)
*B22D 21/02* (2006.01)
*E05B 15/16* (2006.01)

(52) U.S. Cl.
CPC .......... *B23K 31/02* (2013.01); *E05B 15/1635* (2013.01); *E05B 19/04* (2013.01)

(56) References Cited

U.S. PATENT DOCUMENTS

| | | |
|---|---|---|
| 6,196,036 B1 | 3/2001 | Andersen et al. |
| 2011/0179834 A1 | 7/2011 | Mahaffey et al. |

FOREIGN PATENT DOCUMENTS

| | | |
|---|---|---|
| GB | 2533601 B | 11/2016 |
| JP | 07081433 B2 | 8/1995 |
| JP | 2011084907 A | 4/2011 |
| TW | 201139816 A | 11/2011 |

OTHER PUBLICATIONS

Baki et al., "KEY," Amendment, Application No. GB1423036.1, Dated Sep. 30, 2016, 18 pages.
Intellectual Property Office, "Notification of Grant," Patent Serial No. GB2533601, Patents Act 1977: Patents Rules 2007, Dated Oct. 25, 2016, 2 pages.
Intellectual Property Office, "UK Search Report," Application No. GB423036.1, Dated Jun. 10, 2015, 3 pages.
Baki et al., "KEY," U.S. Appl. No. 15/425,349, filed Feb. 6, 2017.
List of IBM Patents or Patent Applications Treated as Related, Signed Feb. 3, 2017, 2 pages.
Wikipedia, "Shape-memory alloy," Wikipedia, the Free Encyclopedia, printed on Feb. 6, 2017, 7 pages https://en.wikipedia.org/wiki/Shape-memory_alloy#Pseudo-elasticity.

KEY

PRIOR FOREIGN APPLICATION

This application claims priority from the United Kingdom patent application number 1423036.1, filed Dec. 23, 2014, which is hereby incorporated herein by reference in its entirety.

BACKGROUND

The present invention relates to a key. More particularly embodiments of the present invention relate to a key resistant to breakage in operation.

The use of a mechanical lock operated by insertion of a matching key as a security mechanism is well known. Examples of locks in use today include the lever tumbler lock and the pin tumbler lock. Keys for a variety of locks are usually made from a metal or metal alloy and share a basic structure. At one end is a head portion (which may also be called the bow or grip) which is held by a user of the key to insert the lock-engaging portion at the other end (which may also be called the bit) into the lock, and to turn the key about its long axis to operate the lock mechanism by the lock-engaging portion. Depending on the type of lock and key, the head and lock-engaging portion may be joined by a shaft representing perhaps most of the length of the key (for example in a key operating a typical lever tumbler lock) or by a short joining section (for example in a key operating a typical pin tumbler lock).

A common problem in many locks, particularly in those exposed to the effects of weather or in those which are operated infrequently, is that the lock mechanism can partially or totally seize up. The increased resistance in the lock mechanism requires a user to apply more force to attempt to turn the key and operate the lock. The force applied to overcome the resistance of the lock mechanism produces stress in the key material. When the yield strength of the key material is exceeded, the key begins to deform plastically. The hardened metallic material making up a typical key will not deform far before it breaks. A similar situation may arise in which a user inserts a key in the incorrect lock in error and attempts to turn the key.

Frequently the break occurs near the point at which the key enters the face of the lock leaving the lock-engaging portion of the key in the lock. It may only be removed with difficulty, which usually requires the services of a locksmith. In the meantime the lock is immobilized and the key unusable.

U.S. Pat. No. 6,196,036 describes a torque-limited key which includes a grip and a lock or latch engaging member. A torque-limiting device connects the grip to the engaging member. The torque-limiting device may include a spring, a frictional engagement, or any other type of resilient member. The torque-limiting device allows a torque applied to the grip to rotate the engaging member, so long as the applied torque is less than a predetermined level. If the applied torque exceeds the predetermined level, the grip will rotate relative to the engaging member in order to prevent breaking the engaging member off inside the lock or latch, and also in order to prevent damaging the mechanism of the lock or latch.

It would be desirable to provide a further solution to the above problem which does not require a key which contains a number of moving parts.

SUMMARY

In one or more aspects, provided herein is a key for operating a mechanical lock. The key includes: a head portion for holding by a user; a lock-engaging portion for inserting into the mechanical lock for operating the mechanical lock by applying a turning force; and a joining portion between the head portion and the lock-engaging portion and fixing the head portion to the lock-engaging portion, the joining portion comprising a shape memory material, the shape memory material reversibly deforming without breakage when a first turning force on the key is exceeded, the first turning force being lower than a second turning force, the second turning force being a turning force which if exceeded causes breakage of the lock-engaging portion or the head portion.

In one or more further aspects, a method of manufacturing a key for operating a mechanical lock is provided. The method includes: providing a head portion of the key; providing a lock-engaging portion of the key; providing a joining portion for joining the head portion to the lock-engaging portion, the joining portion comprising a shape memory material, the shape memory material reversibly deforming without breakage when a first turning force on the key is exceeded, the first turning force being lower than a second turning force, the second turning force being a turning force which if exceeded causes breakage of one of the lock-engaging portion or the head portion; and forming the key from the head, lock-engaging and joining portions.

BRIEF DESCRIPTION OF THE DRAWINGS

Embodiments of the present invention are described below, by way of example only, with reference to the drawings, in which.

DETAILED DESCRIPTION

Figure 1:
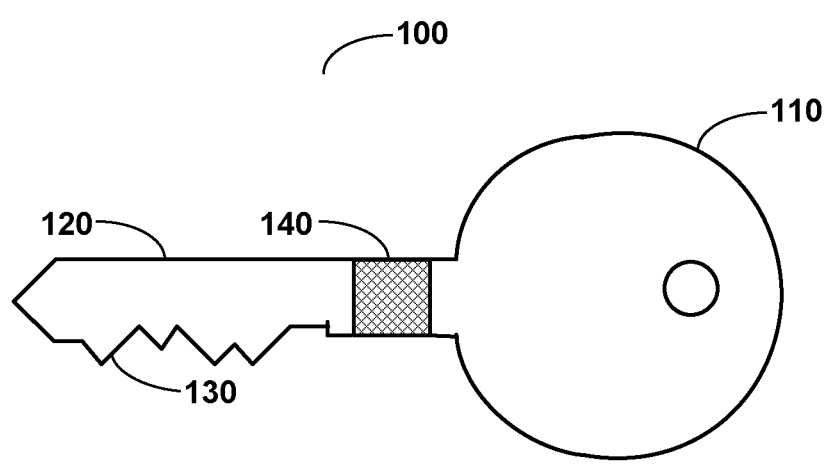
FIG. 1 illustrates a key according to one or more aspects of the present invention.

Shape memory alloys are shape memory materials which are a group of metallic materials which exhibit certain unusual properties when subjected to mechanical load. Firstly, they show the shape memory effect. This refers, for instance, to the ability of the alloys to be deformed at a low temperature and then revert to a prior shape when heated above a certain temperature which is characteristic of the particular alloy. The prior shape is then retained on cooling. Secondly, many of these alloys exhibit the property of superelasticity, sometimes called pseudo-elasticity or pseudo-plasticity. This refers to the ability to undergo a large amount of deformation under load and recover their shape after unloading. Certain other materials, including some polymers and ceramic materials, also exhibit these shape memory material properties. Further information on shape memory materials may be found in Otsuka, K. and Wayman, A. M. (Eds.), "Shape Memory Materials", Cambridge University Press, 1998.

The shape memory effects and superelasticity exhibited by shape memory alloys are both driven by the crystallographically reversible martensitic phase transformation. This describes the transformation between two phases, normally called the austenitic and martensitic phases. The austenitic phase is stable (i.e. has lower free energy) at higher temperatures and the martensitic phase is stable at lower temperatures. The austenitic phase is sometimes called the parent phase.

In an example, a shape memory alloy object is at a temperature at which the austenitic phase is favored. The item is bent, in the process forming the deformation induced martensitic phase. The item is heated to a temperature above the martensitic to austenitic transition temperature and the item is converted back to the austenitic phase and returns to its original shape. The austenitic to martensitic transition temperature is lower, the phase change diagram being different in the reverse direction, and so the object retains its original shape. This illustrates the shape memory effect.

In another example, a shape memory alloy object is subjected to load which deforms the object. Within a certain stress range, and depending also on being within a certain temperature band, superelasticity will occur so that the object will deform with the formation of the martensitic phase, and return to the austenitic phase and so its original shape, when the load is removed. This illustrates the superelastic effect.

The properties of a given shape memory alloy with regard particularly to its phase transition temperatures and the temperature range within which it exhibits superelasticity are dependent on the composition with regard to the metals present and their proportions in the alloy. Examples of shape-memory alloys are nickel-titanium (Ni—Ti) alloys, also known as nitinol, and various alloys of copper and iron, for example Cu—Al—Ni, Cu—Zn—Al and Fe—Mn—Si. Nickel-titanium alloys are particularly favored for many purposes because of their relative stability and good thermomechanical properties, although they may also be relatively expensive to produce because of the presence of titanium.

Generally stated, the keys disclosed herein incorporate a shape memory material. For instance, in accordance with one or more aspects of the present invention, a key is provided for operating a mechanical lock. The key comprises a head portion for holding by a user, a lock-engaging portion for inserting into the mechanical lock for operating the mechanical lock by applying a turning force, and a joining portion between the head portion and the lock-engaging portion and fixing the head portion to the lock-engaging portion. The joining portion comprises a shape memory material, which reversibly deforms without breakage when a first turning force on the key is exceeded, the first turning force being lower than a second turning force, the second turning force being a turning force which if exceeded causes breakage of one of the lock-engaging portion or the head portion.

In one or more embodiments, the shape memory material may be a shape memory metal alloy. Further, the reversal of the deforming of the shape memory material may result from the ceasing of the application of turning force.

In one or more embodiments, the reversal of the deforming of the shape memory material may result from the ceasing of the application of turning force and the further application of heat to the joining portion, the temperature of the joining portion being raised above a state transition temperature of the shape memory material.

In one or more implementations, either or both the head portion or the lock-engaging portion may further comprise the shape memory material.

In one or more embodiments, the joining portion may comprise a hollow cross-section for at least part of its length.

In one or more embodiments, the key further comprises a weaker portion of the lock-engaging portion, the weaker portion being constructed so as to break when the second turning force is exceeded.

In one or more embodiments, the key further comprises a fully enclosed hollow chamber within the lock engaging portion, the hollow chamber being exposed on breaking at the weaker portion and the hollow chamber containing an air-setting fluid released thereby.

In one or more embodiments, the air-setting fluid may comprise an air-setting adhesive composition.

According to one or more further aspects of the present invention, a method is provided for manufacturing a key for operating a mechanical lock. The method comprises providing a head portion of the key, providing a lock-engaging portion of the key, and providing a joining portion for joining the head portion to the lock-engaging portion. The joining portion comprises a shape memory material, which reversibly deforms without breakage when a first turning force on the key is exceeded, the first turning force being lower than a second turning force, the second turning force being a turning force which if exceeded causes breakage of the lock-engaging portion or the head portion. The method further comprises forming the key from the portions.

In one or more embodiments, the method further comprises providing the shape memory material to be a shape memory metal alloy.

In one or more embodiments, the forming comprises positioning the head portion and the lock-engaging portion at opposite ends of the joining portion, and fixing the head portion and the lock-engaging portion to the joining portion at their respective opposite ends.

In one or more embodiments, the fixing comprises: a bonding process; a push-fit process; or a metallurgical process.

In one or more embodiments, the forming comprises a casting process.

In one or more embodiments, in the method at least one of the head portion or the lock-engaging portion further comprises the shape memory material.

In one or more embodiments, in the method the joining portion comprises a hollow cross-section for at least part of the joining portion's length.

In one or more embodiments, the method further comprises providing a weaker portion of the lock-engaging portion, the weaker portion being constructed to break when the second turning force is exceeded.

In one or more embodiments, the method further comprises providing the lock-engaging portion with a hollow chamber fully enclosed once key construction is complete and exposed on breaking at the weaker portion, the hollow chamber containing an air-setting fluid.

In one or more embodiments, the air-setting fluid comprises an air-setting adhesive composition.

FIG. 1 illustrates a key 100 according to one or more aspects of the present invention. Key 100 is illustrated as a key for a pin tumbler lock but it will be apparent to a person skilled in the art that embodiments of the invention may comprise a key for a lever tumbler lock or for any other known type of lock. Key 100 comprises head portion 110 for holding by a user during operation of the key as it is inserted into the lock by the user and turned by the user after insertion into the lock to operate the lock mechanism. Key 100 also comprises lock-engaging portion 120 which comprises the arrangement of peaks and troughs 130 in the unique pattern which is adapted to operate its matching lock.

In one or more embodiments, key head portion 110 and lock-engaging portion 120 are not attached directly to each other. Key 100 further comprises joining portion 140 which is operable for securely attaching to each of head portion 110 and lock-engaging portion 120. Joining portion 140 may be a relatively short bridging member which, when securely attached to each of head portion 110 and lock-engaging portion 120, forms key 100 which is rigid in normal operation.

In certain embodiments of the invention, joining portion 140 may comprise a reversibly deformable shape memory material, which is operable for reversibly deforming without breaking when a first turning force is applied in operation of key 100 in a lock. Joining portion 140 may comprise a shape memory material, for example, a shape memory alloy exhibiting the property of either or both of shape memory and superelasticity at the conditions of temperature which occur during normal operation of the lock.

In one or more embodiments of the invention, joining portion 140 is attached to each of head portion 110 and lock-engaging portion 120 by means of, for instance: metallurgical processes, gluing using an adhesive, push fitting for an interference fit. A person skilled in the art will understand that other attachment means may be employed without departing from the scope of the invention.

In one or more embodiments, joining portion 140 may be attached to head portion 110 and lock-engaging portion 120 by forming in a metallurgical process. In this embodiment, head portion 110 and lock-engaging portion 120 may comprise a metal or metal alloy as might be employed for manufacturing a key as known in the art. Each of head portion 110 and lock-engaging portion 120 may be manufactured as a separate piece. Joining portion 140 may be formed from a shape memory material such as a shape memory alloy by a suitable, for example, by casting in a mold. The three separate portions are then assembled and joined together. This joining may be achieved, for example, by heating one of or all of the portions above a melting point of their respective metallic composition so that they melt together to produce a single piece key on cooling.

In certain embodiments, joining portion 140 may comprise a hollow cross-section for at least part of its length. In some embodiments, the joining portion 140 may include a bridging member comprising recessed end portions, or in some embodiments, may comprise a central air space, so as to provide for engagement with push-fitting protuberances of head portion 110 and lock-engaging portion 120. Such push-fitting protuberances may be tapered towards their outer end, for example, of a frusto-conical form. They may be suitably dimensioned so as to provide for a tight fit, or interference fit, when pushed into the recessed portions of joining portion 140 with sufficient force. The respective mating portions may be attached sufficiently firmly together so as to remain as a single key within the limits of normal use of the key in locking and unlocking a lock.

In one or more other embodiments, joining portion 140 may be attached to head portion 110 and lock-engaging portion 120 by bonding using a suitable adhesive, or by any other suitable bonding process. It will be apparent to a skilled person that any other suitable attachment mechanism may be used to attach joining portion 140 to head portion 110 and to lock-engaging portion 120 without departing from the scope of the invention.

In other embodiments, the whole key is formed from a shape memory material, for example from a shape memory alloy, or either or both of head portion and lock-engaging portion may be formed from a shape memory material, for example, a shape memory alloy. In still other embodiments, the key may be formed in a single process which provides for a joining portion of differing composition from the remainder of the key. This may be, for example, a metallurgical process such as a casting process in which the joining portion is cast from a shape memory material, for example a shape memory alloy, and the remainder of the key from a conventional key-making metal alloy.

Figure 2A:
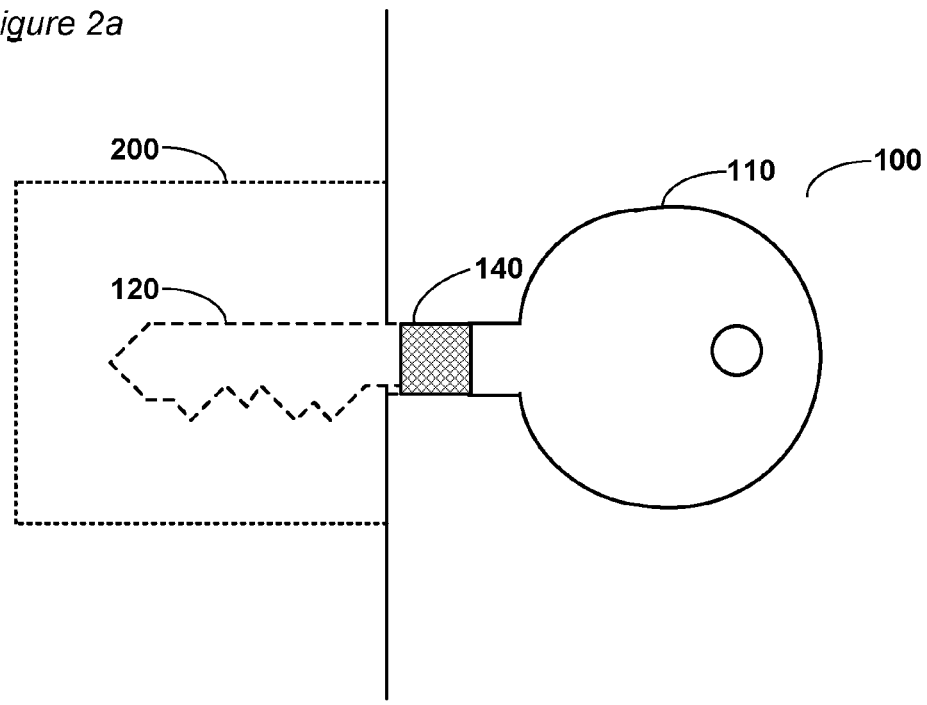
FIGS. 2a & 2b illustrate operation in a lock using a key, according to one or more aspects of the present invention.

FIG. 2a illustrates key 100 in operation in a lock 200. A user inserts key 100 into lock 200, and the user attempts to turn key 100 in lock 200 by the application of turning force to head portion 110 of key 100. In this embodiment, the mechanism of lock 200 is not functioning correctly in that it has excessive resistance to rotation. This may be because of water ingress or lack of lubrication resulting in seizing of the mechanism, for example. It will be apparent that this would also apply where key and lock do not match, in other words the wrong key is being used for the lock. When the user applies increasing turning force to head portion 110 of key 100 inserted into lock 200, resistance of lock 200 to turning of lock-engaging portion 120 prevents key 100 from turning. The user increases the turning force until a first force comprising a load limit of key 100 is exceeded. A conventional key of the prior art on the exceeding of its load limit would break at the position in the key undergoing maximum stress, typically at the outer face of the lock.

Figure 2B:
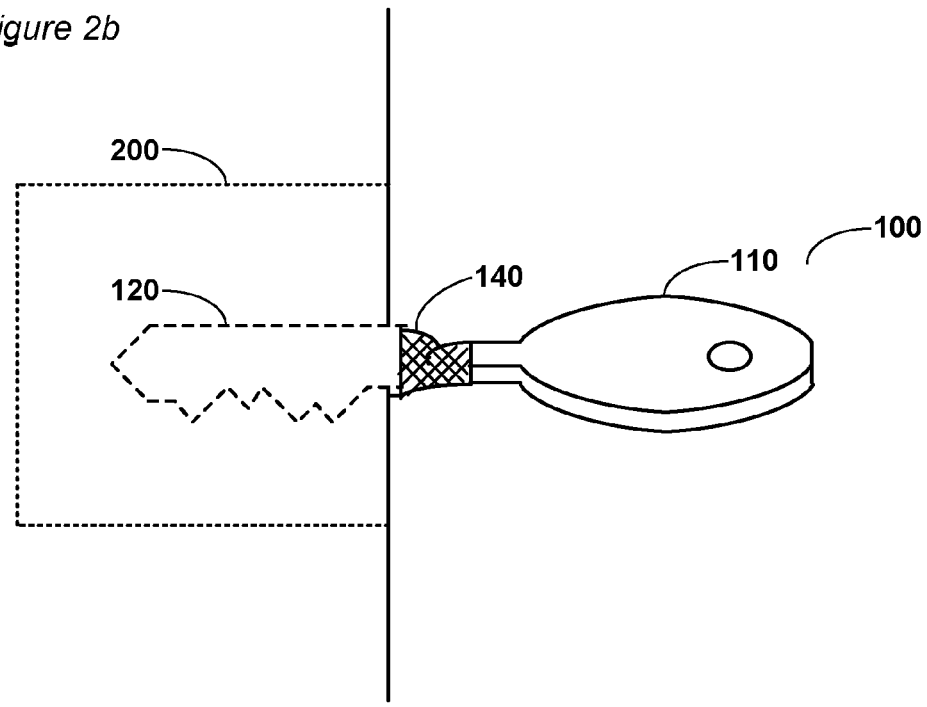

In accordance with aspects of the present invention, as illustrated in FIG. 2b, joining portion 140 deforms rotationally without breaking. In an embodiment of the invention, joining portion 140 comprises a shape memory material, for example a shape memory alloy, as previously described. The user may now withdraw key 100 which remains unbroken.

In one or more embodiments, joining portion 140 comprises a shape memory alloy exhibiting superelasticity. In such embodiments removal of key 100 from lock 200 causes the applied turning force to cease which releases the load from joining portion 140. The superelastically deformed joining portion 140 returns to its starting form and the key is undamaged.

In other embodiments, joining portion 140 may comprise a shape memory alloy exhibiting a shape memory effect, where on removal of key 100 from lock 200, joining portion 140 remains deformed. In such embodiments, key 100 may be returned to its original form by the application of heat, for example in an oven. Once a state transition temperature of the shape memory alloy is exceeded in the oven, the shape memory alloy with return to its original shape, which it retains on cooling.

Figure 3A:
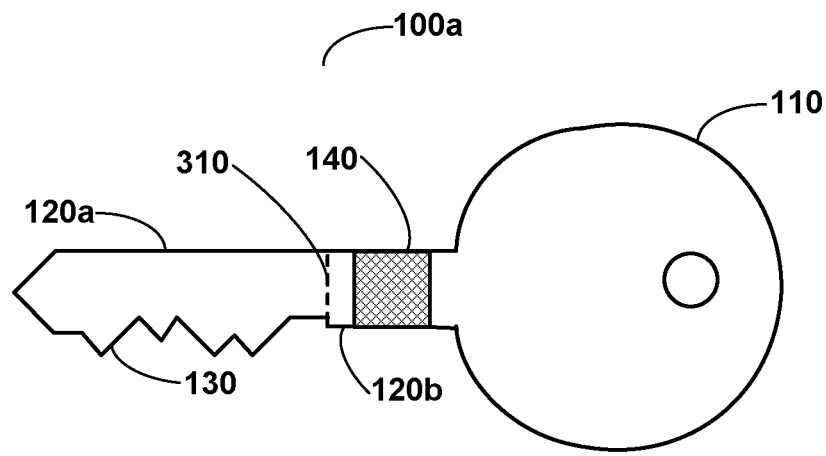
FIGS. 3a & 3B illustrate alternate embodiments of a key, according to one or more aspects of the present invention.

In another embodiment illustrated in FIG. 3a, key 100a may be provided with a portion weaker than the remainder of the key, illustrated at position 310 of key 100a, so that when breakage occurs it is at the position of this portion. In this embodiment, the key deforms as described with reference to previously described embodiments when the first turning force is exceeded while key 100a is fully inserted in lock 200. In this embodiment, should the user continues to turn the key, applying additional turning force until a second turning force is exceeded, then breakage of the key occurs.

In one or more embodiments, the weaker portion of key 100a may comprise a short lengthwise section, relative to the total length of the key, at position 310 and across the full width of the lock-engaging portion 120a, 120b. In one embodiment, the weaker portion 310 is at the position on the lock-engaging portion which is level with the face of lock 200 when the key is fully inserted therein. When the second turning force is exceeded and breakage of the key occurs, portion 120a of lock engaging portion 120a, 120b remains in lock 200 while portion 120b is retained on the other part of the broken key, which is removed by the user. Lock retained portion 120a prevents further use of lock 200 unless a specialist tool is used for removal of portion 120a.

Figure 3B:
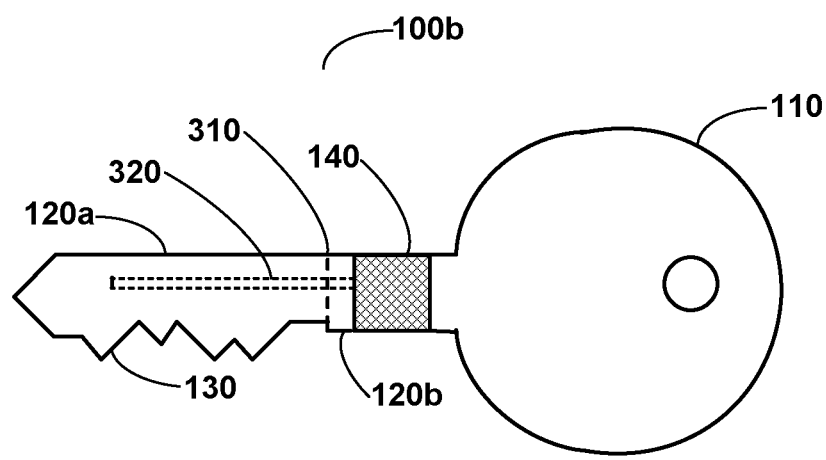

In another embodiment as illustrated in FIG. 3b, key 100b may comprise a structure similar to key 100a, and further comprises a chamber 320 within lock-engaging portion 120a, 120b. Chamber 320 may be completely sealed within key 100b during normal operation of key 100b. Chamber 320 further comprises a setting fluid contained within it. It will be apparent that although chamber 320 is illustrated as a hollow cavity along the length of lock-engaging portion 120a, 120b, chamber 320 may be of any suitable shape and dimensions without departing from the scope of the invention. A user fully inserts key 100b into lock 200 and applies turning force as described with reference to key 100a above.

When the second turning force is exceeded, breakage of key 100b occurs at weaker portion 310 as described with reference to use of key 100a above, in one embodiment, at a position flush with the face of lock 200. In this embodiment, breakage at position 310 opens chamber 320 and thereby releases the setting fluid contained therein. The setting fluid may comprise any suitable fluid which sets on exposure to air, for example an air-setting adhesive composition. The setting fluid will set at the face of the lock and some may enter the space between portion 120a and lock 200 by capillary action. Once the setting fluid is set, lock 200 is immobilized.

Figure 4:
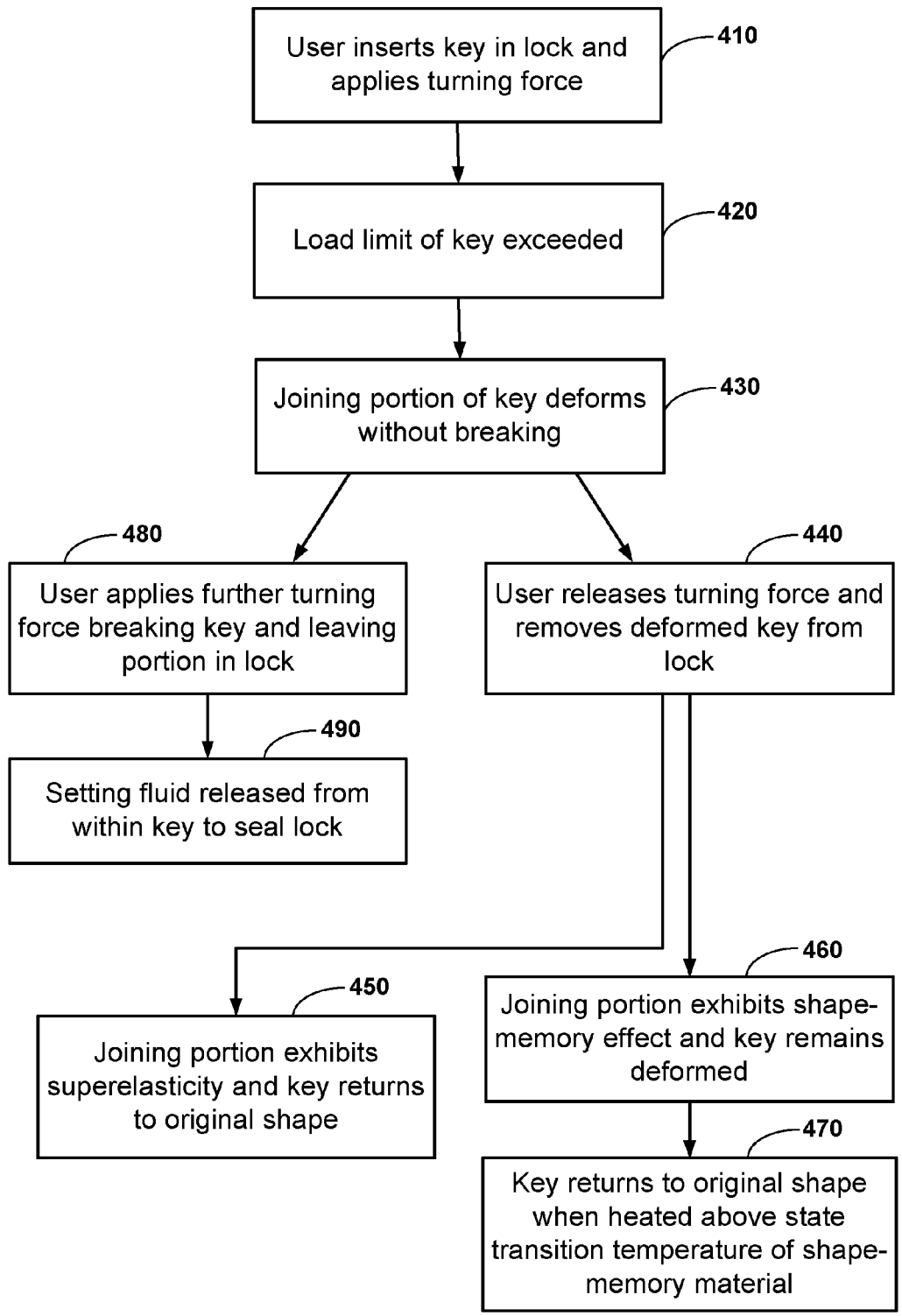
FIG. 4 is a flowchart illustrating one embodiment of operation of a key, in accordance with one or more aspects of the present invention.

FIG. 4 is a flowchart illustrating the operation of embodiments of the present invention. A user inserts a key 100 according to embodiments of the present invention into a lock 200 according to the prior art at step 410 and applies a turning force to the key to attempt to operate the lock. At step 420, the force applied exceeds the load limit of the key 100.

At step 430, exceeding of the load limit causes joining portion 140 of key 100 to deform. At step 440 for the embodiment illustrated in FIGS. 2a and 2b the user removes the deformed key 100 from the lock 200. If the joining portion 140 of key 100 comprises a material exhibiting superelasticity, joining portion 140, and so key 100, returns to its original shape in step 450. As will be apparent to a skilled person, step 450 may occur before step 440 or in one action, so that the user may release turning force and the key 100 return to its original shape before or during removal from the lock 200.

If the joining portion 140 of key 100 comprises a material which exhibits a shape memory effect, joining portion 140, and so key 100, remains deformed at step 460. Key 100 may be returned to its original shape at step 470 by heating joining portion 140 above the state-transition temperature of the material of which it is comprised, for example a shape memory alloy. Above this temperature, the shape memory material, for example shape memory alloy, of joining portion 140 returns to its original shape, which is retained on cooling so that key 100 is returned to its original shape.

For the embodiment illustrated by FIG. 3a and described above, the user of key 100a at step 430, instead of releasing the application of turning force, increases the application of turning force at step 480. When the turning force applied exceeds the force required to break the key at weaker portion 310 the key breaks leaving portion 120a in the lock so immobilizing it.

For a further embodiment illustrated in FIG. 3b and described above, key 100b in addition to the features of key 100a comprises a chamber containing a fluid which sets on exposure to the air, for example an air-setting adhesive fluid composition. When the key breaks at step 480, the setting fluid is released and sets at the face of the lock so as to seal the lock at step 490.

One or more aspects of the present invention provide a key which may be removed without leaving a portion of a broken key in the lock. The lock remains useable and may be treated, for example with a suitable lubricant or anti-corrosion fluid, so as to restore normal functioning of the lock. The key also remains useable, either immediately or after further treatment as described above. Certain aspects of the present invention provide a key resistant to breakage in operation. Further aspects provide a key which may be broken to leave a portion in the lock, optionally with the release of a setting fluid, so as to immobilize the lock.

Those skilled in the art will understand that further embodiments of the present invention are possible using different types of key and lock or locking mechanism without departing from the scope of the present invention.

What is claimed is:

1. A key for operating a mechanical lock, the key comprising:
    a head portion for holding by a user;
    a lock-engaging portion for inserting into the mechanical lock for operating the mechanical lock by applying a turning force; and
    a joining portion between the head portion and the lock-engaging portion and fixing the head portion to the lock-engaging portion, the joining portion comprising a shape memory material, the shape memory material reversibly deforming without breakage when a first turning force on the key is exceeded, the first turning force being lower than a second turning force, the second turning force being a turning force which if exceeded causes breakage of the lock-engaging portion or the head portion.

2. The key of claim 1, wherein the shape memory material is a shape memory metal alloy.

3. The key of claim 1, wherein the reversal of the deforming of the shape memory material results from the ceasing of the application of turning force.

4. The key of claim 1, wherein the reversal of the deforming of the shape memory material results from the ceasing of the application of turning force and the further application of heat to the joining portion, the temperature of the joining portion being raised above a state transition temperature of the shape memory material.

5. The key of claim 1, wherein at least one of the head portion or the lock-engaging portion further comprises the shape memory material.

6. The key of claim 1, wherein the joining portion comprises a hollow cross-section for at least part of the joining portion's length.

7. The key of claim 1, further comprising a weaker portion of the lock-engaging portion, the weaker portion being constructed so as to break when the second turning force is exceeded.

8. The key of claim 7, further comprising a fully enclosed hollow chamber within the lock engaging portion, the hollow chamber being exposed on breaking at the weaker portion and the hollow chamber containing an air-setting fluid released thereby.

9. The key of claim 8, wherein the air-setting fluid comprises an air-setting adhesive composition.

* * * * *